(12) United States Patent
Yanobe et al.

(10) Patent No.: US 11,953,891 B2
(45) Date of Patent: Apr. 9, 2024

(54) WORK MANAGEMENT SYSTEM AND WORK MANAGEMENT METHOD

(71) Applicant: TOPCON CORPORATION, Tokyo (JP)

(72) Inventors: Satoshi Yanobe, Tokyo (JP); Toshio Yamada, Tokyo (JP); Kazuki Osaragi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 443 days.

(21) Appl. No.: 17/235,763

(22) Filed: Apr. 20, 2021

(65) Prior Publication Data

US 2021/0341908 A1 Nov. 4, 2021

(30) Foreign Application Priority Data

Apr. 30, 2020 (JP) ................. 2020-080480

(51) Int. Cl.
  *G05B 19/418* (2006.01)
  *G06T 7/00* (2017.01)
  *G06T 7/557* (2017.01)

(52) U.S. Cl.
  CPC ..... *G05B 19/4187* (2013.01); *G05B 19/4183* (2013.01); *G06T 7/0004* (2013.01); *G06T 7/557* (2017.01); *G05B 2219/40613* (2013.01)

(58) Field of Classification Search
  CPC ............ G05B 19/4187; G05B 19/4183; G06T 7/0004; G06T 7/557; G06T 2207/10012; G06T 2207/30164; G06T 7/73
  See application file for complete search history.

(56) References Cited

U.S. PATENT DOCUMENTS

2019/0086206 A1* 3/2019 Nishita ................. B64D 47/08
2020/0056878 A1* 2/2020 Nahum ............... B25J 17/0258

FOREIGN PATENT DOCUMENTS

JP 2019045962 A 3/2019

\* cited by examiner

*Primary Examiner* — Chad G Erdman
(74) *Attorney, Agent, or Firm* — Studebaker & Brackett PC

(57) ABSTRACT

Provided is a work management system enabling real-time inspection by simultaneously performing work and measurements. The work management system includes a tool including a communication unit and a trigger switch, a camera unit including a communication unit, a camera capable of identifying 3D camera coordinates from an image, a posture detecting device configured to acquire camera posture information, a control unit, and a prism, and a surveying instrument including a communication unit, a tracking unit, a distance-measuring unit, an angle-measuring unit, and a control unit, wherein upon detection that the trigger switch has been used, the camera unit collects camera posture information by the posture detecting device, a tool image by the camera, position coordinates of the prism measured by the surveying instrument, and orientation information of the camera unit viewed from the surveying instrument, and obtains and stores position coordinates of a tip end position of the tool.

19 Claims, 16 Drawing Sheets

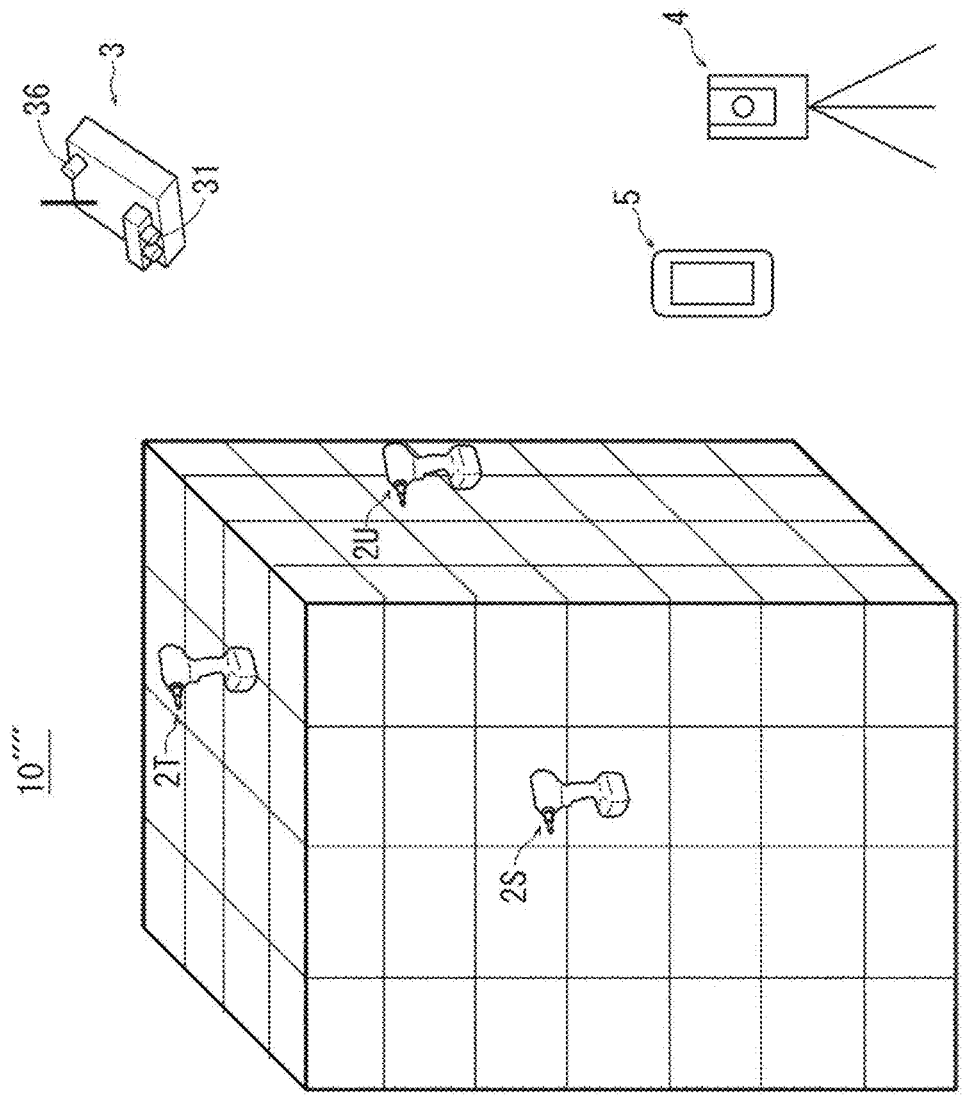

WORK MANAGEMENT SYSTEM AND WORK MANAGEMENT METHOD

TECHNICAL FIELD

The present invention relates to a work management system at a construction site, particularly to a work management system, etc., managing on-site work using a tool.

BACKGROUND ART

In construction work and plant construction work, etc., there are construction works such as reinforced concrete floors, ceilings, and walls, etc., and in recent years, these construction works are designed by using 3D models called BIM (Building Information Modeling). In these types of work, an inspection is conducted to confirm that a construction work is constructed as designed by BIM. In the inspection, a construction work for which a worker performed a work was inspected by visual confirmation by a builder and/or a designer or by referring to measurement data obtained by measuring the construction work by a laser scanner, etc., as described in Patent Literature 1.

CITATION LIST

Patent Literature

[Patent Literature 1] Japanese Published Unexamined Patent Application No. 2019-45962

SUMMARY OF INVENTION

Technical Problem

However, this inspection to be conducted by a method which measures a construction work after construction puts a workload of a measurement for the inspection on a builder and a designer, puts a workload on a worker due to sending the worker for the inspection, and further puts a workload on the worker when the work needs to be performed again according to inspection results.

The present invention was made in view of these problems, and an object thereof is to provide a work management system, etc., that realizes real-time inspection by simultaneously performing a work and a measurement.

Solution to Problem

In order to solve the problems described above, a work management system according to an aspect of the present invention includes a tool including a communication unit and a trigger switch, a camera unit including a communication unit, a camera capable of identifying 3D camera coordinates from an image, a posture detecting device configured to acquire camera posture information of the camera, a control unit configured to control the camera and the posture detecting device, and a prism, a surveying instrument including a communication unit, a tracking unit configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit, wherein upon detection that the trigger switch has been used by communication from the tool, the camera unit collects camera posture information by the posture detecting device, a tool image by the camera, position coordinates of the prism measured by the surveying instrument, and orientation information of the camera unit viewed from the surveying instrument, and obtains and stores position coordinates of a tip end position of the tool.

A work management system according to another aspect of the present invention includes a tool including a communication unit and a trigger switch, a camera unit including a communication unit, a camera capable of identifying 3D camera coordinates from an image, a posture detecting device configured to acquire camera posture information of the camera, a control unit configured to control the camera and the posture detecting device, and a prism, a surveying instrument including a communication unit, a tracking unit configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit, a site controller including a communication unit, a display unit, a control unit, and a storage unit, and configured to be operated by a worker, and a management server including a communication unit, a control unit, and a storage unit including a work results database, wherein the site controller causes the surveying instrument to start automatic tracking by the tracking unit, causes the camera unit to start measurements by the camera and the posture detecting device, and acquires trigger information of the tool, and upon detection that the trigger switch has been used, requests position coordinates of a tip end position of the tool from the camera unit, and transmits and stores the position coordinates of the tip end position of the tool in the management server.

In the aspect described above, it is also preferable that the camera unit obtains camera coordinates of a tip end position of the tool from the tool image, obtains position coordinates of a camera coordinate system center by shifting from position coordinates of the prism obtained by the surveying instrument by an offset distance between a center of the prism and the camera coordinate system center in a shifting direction obtained from the camera posture information and the orientation information of the camera unit, and obtains position coordinates of the tip end position of the tool by converting the camera coordinates of the tip end position of the tool into position coordinates based on the position coordinates of the camera coordinate system center.

In the aspect described above, it is also preferable that the camera unit acquires the orientation information of the camera unit by acquiring a light image of the distance-measuring light or the tracking light by the camera and performing image analysis of a luminous point in the light image.

In the aspect described above, it is also preferable that the camera unit acquires the camera posture information by an inertial measurement unit or by extracting a vertical line in an image of the camera and obtaining a vertical direction in the image.

In the aspect described above, it is also preferable that the camera unit acquires the camera posture information and the orientation information of the camera unit by capturing motions of reflection markers attached to the surveying instrument by the camera.

In the aspect described above, it is also preferable that the camera unit obtains camera coordinates of the tip end position of the tool by stereo matching by the camera or by capturing motions of reflection markers attached to the tool by the camera.

In the aspect described above, it is also preferable that the management server further includes a design database, and position coordinates of the tip end position of the tool are stored as tool tip end position information in the work results database together with information showing that a work has been performed, and the tool tip end position information is managed by being linked to the design database.

In the aspect described above, it is also preferable that position coordinates of the tip end position of the tool are stored in association with attributes information including at least worker identification information and tool information concerning the tool.

In the aspect described above, it is also preferable that the tool is provided with an identification feature capable of being imaged and identified by the camera of the camera unit, a plurality of the tools are simultaneously managed.

A work management method is also preferable that includes a step of causing the surveying instrument to start automatic tracking by the tracking unit, a step of causing the camera unit to start measurements by the camera and the posture detecting device, a step of acquiring trigger information of the tool, a step of calculating position coordinates of the tip end position of the tool, and a step of storing the position coordinates of the tip end position of the tool, by using the work management system according to the aspect described above.

A work management program is also preferable that describes the work management method according to the aspect described above as a computer program and enables execution of the work management method.

Effect of Invention

According to the work management system, etc., of the present invention, a work by a worker is automatically measured by the same system in real time.

BRIEF DESCRIPTION OF DRAWINGS

FIG. 16 is a view illustrating a state where a work management system according to Modification 5 is disposed.

DESCRIPTION OF EMBODIMENTS

Next, preferred embodiments of the present invention will be described with reference to the drawings.

First Embodiment

Configuration of Work Management System According to First Embodiment

Figure 1:
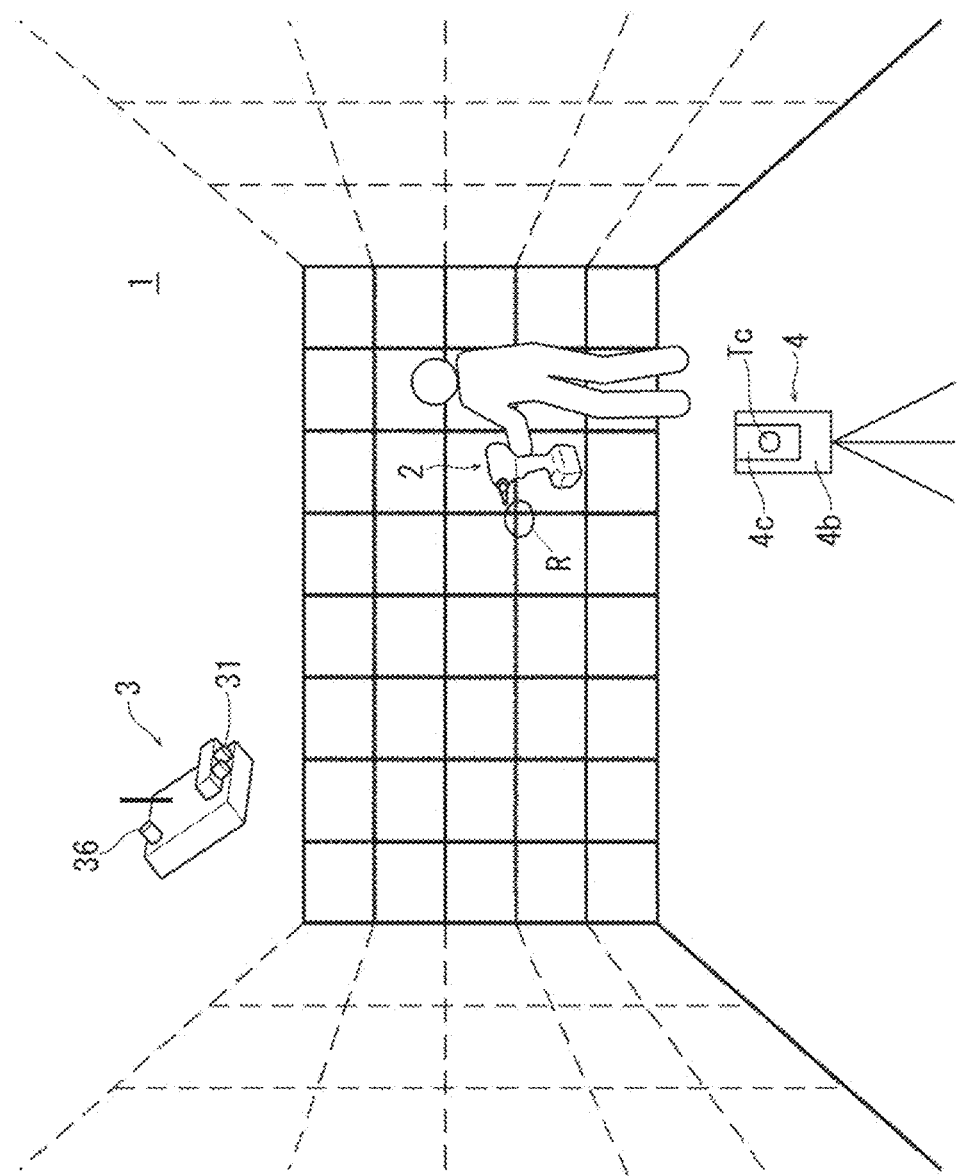
FIG. 1 is a view illustrating a state where a work management system according to a first embodiment is disposed at a work site.
Figure 2:
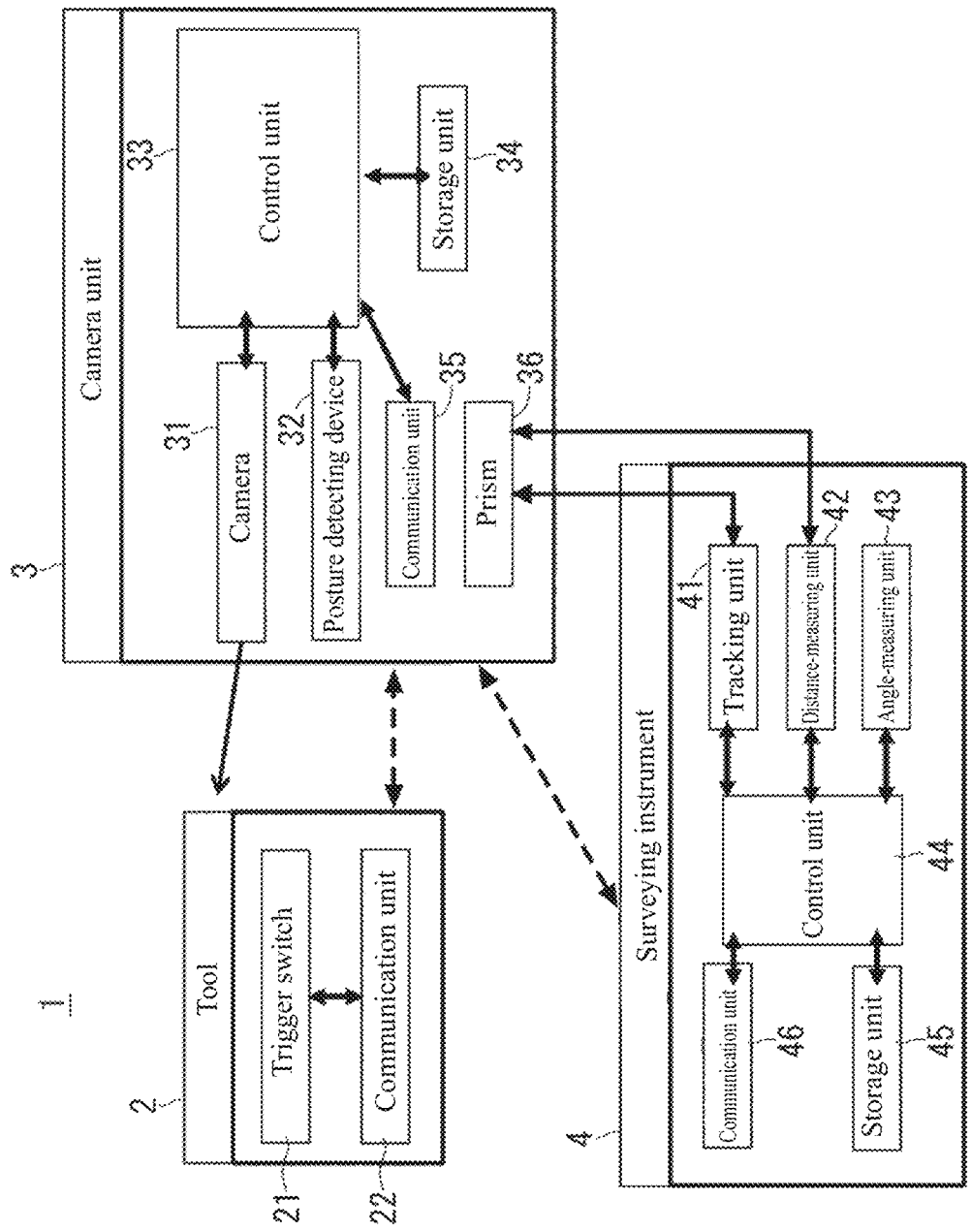
FIG. 2 is a configuration block diagram of the same system.

FIG. 1 is a view illustrating a state where a work management system 1 according to a first embodiment is disposed at a work site, and FIG. 2 is a configuration block diagram of the same system 1. The work site illustrated in FIG. 1 is construction of main reinforcements and hoop reinforcements of a wall constituting a closed space. As illustrated in FIG. 1, a work management system 1 of the present embodiment includes a tool 2, a camera unit 3, and a surveying instrument 4.

The tool 2 is used by a worker as illustrated in FIG. 1. The tool 2 corresponds to various tools to be used for construction work, such as an impact wrench, a welder, a reinforcement restraining machine, a screwdriver, a sealing gun, a tacker, a nailing machine, a riveter, a board cutter, hammer drill, a scraper, a nibbler, and a puncher. In the present embodiment, the tool 2 is, for example, a reinforcement restraining machine that winds a binding band around a node of a main reinforcement and a hoop reinforcement. As illustrated in FIG. 2, the tool 2 includes a trigger switch 21 to operate turning ON/OFF of the tool, and a communication unit 22.

The camera unit 3 is installed at an arbitrary position at the work site as illustrated in FIG. 1. The camera unit 3 is installed by hanging it from the ceiling of the site in FIG. 1, however, it can be freely installed at any position by standing it on a tripod, placing it on a shelf, or fixing it to the tool 2. As described later, a posture and an orientation of the camera unit 3 are grasped by the system 1, so that its installed position does not necessarily have to be fixed.

The camera unit 3 includes, as illustrated in FIG. 2, a camera 31, a posture detecting device 32, a control unit 33, a storage unit 34, a communication unit 35, and a prism 36.

The camera 31 is a stereo camera including two digital cameras each including an image sensor such as a CCD or a CMOS sensor as an imaging device. The camera 31 acquires 3D camera coordinates (hereinafter, camera coordinates are represented by lowercase characters x, y, and z) in which positions of the respective pixels are identified by an orthogonal coordinate system with an origin set at a camera coordinate system center, and information in a depth direction is identified by binocular parallax. It is more preferable that the camera 31 can acquire an entire circumferential (360°) image.

The posture detecting device 32 is an inertial measurement unit (IMU), and acquires a local posture of the camera itself, that is, 3D acceleration and angular velocity data (hereinafter, referred to as "camera posture information") of the camera unit 3.

The prism 36 has retroreflective properties, and is more preferably a 360° prism capable of retro-reflecting light entering in any direction (360° directions).

The control unit 33 is, for example, a microcontroller, and consists of a CPU, a RAM, and a ROM, etc. The storage unit 34 consists of a storage medium, for example, a memory card, an HDD (Hard Disk Drive), etc.

The camera unit 3 is configured by aggregating these camera 31, posture detecting device 32, control unit 33, storage unit 34, and communication unit 35 in one housing. The configuration of the camera unit 3 illustrated in FIG. 1 is an example, and the camera unit 3 may have other configurations as long as the camera 31 is positioned so as to easily acquire images in 360° directions, and the prism 36 is positioned so as to easily receive light from 360° directions. However, the positional relationship among the components is fixed, and offset distances are measured in advance and stored in the storage unit 34.

The surveying instrument 4 is a total station (electronic distance-measuring and angle-measuring instrument), and is installed at a point whose position coordinates (3D absolute coordinates) are clear at the work site by using a tripod as illustrated in FIG. 1. The surveying instrument 4 includes a base portion provided on a leveling unit, a bracket portion 4b that rotates horizontally on the base portion, and a telescope 4c that rotates vertically at the center of the bracket portion 4b.

The surveying instrument 4 includes, as illustrated in FIG. 2, a tracking unit 41, a distance-measuring unit 42, an angle-measuring unit 43, a control unit 44, a storage unit 45, and a communication unit 46. The tracking unit 41 and the distance-measuring unit 42 are housed in the telescope 4c, and the angle-measuring unit 43, the control unit 44, the storage unit 45, and the communication unit 46 are housed in the bracket portion 4b.

The distance-measuring unit 42 transmits a pulse laser light as distance-measuring light to the prism 36. Then, the distance-measuring unit 42 receives reflected light from the prism 36 by a light receiving unit such as a photodiode.

The angle-measuring unit 43 is an angle detector, for example, a rotary encoder, etc. The angle-measuring unit 43 detects a rotation angle of the bracket portion 4b in the horizontal direction and a rotation angle of the telescope 4c in the vertical direction.

The tracking unit 41 includes a tracking light transmitting system that transmits tracking light with a wavelength different from that of the distance-measuring light, and a tracking light receiving system such as an image sensor. The tracking light transmitting system transmits tracking light. The tracking light receiving system acquires a landscape image including reflected tracking light from the prism 36, and a landscape image when tracking light is not emitted, performs image analysis of a difference between the images, and detects a position at which a deviation between a prism center and a visual axis center of the telescope 4c is within a certain value as a position of the prism 36.

The control unit 44 is, for example, a microcontroller, and consists of a CPU, a RAM, a ROM, etc. The control unit 44 controls the tracking unit 41, and controls rotations of the bracket portion 4b and the telescope 4c so that the telescope 4c always faces the direction of the prism 36 to automatically track the prism 36. In addition, the control unit 44 controls the distance-measuring unit 42 and the angle-measuring unit 43 and measures a distance to the prism 36 based on a phase difference between reflected distance-measuring light and internal reference light, and when measuring the distance, detects the rotation angle in the horizontal direction and the rotation angle in the vertical direction, and measures position coordinates of the prism 36 (hereinafter, position coordinates that are 3D absolute coordinates are represented by uppercase characters X, Y, and Z).

The storage unit 45 consists of a storage medium, for example, a memory card, an HDD (Hard Disk Drive), etc. The storage unit 45 stores a program for the control described above of the control unit 44.

In the configuration described above, the tool 2 transmits trigger information of the trigger switch 21 to the camera unit 3 through the communication unit 22. The surveying instrument 4 transmits position coordinates of the prism 36 to the camera unit 3 through the communication unit 46. Radio communication between the tool 2 and the camera unit 3 preferably uses Bluetooth low energy (Bluetooth is a registered trademark), but is not limited to this. Radio communication between the camera unit 3 and the surveying instrument 4 can use a wireless LAN and Bluetooth (registered trademark), but is not limited to these.

Work Management Method According to First Embodiment

Figure 3:
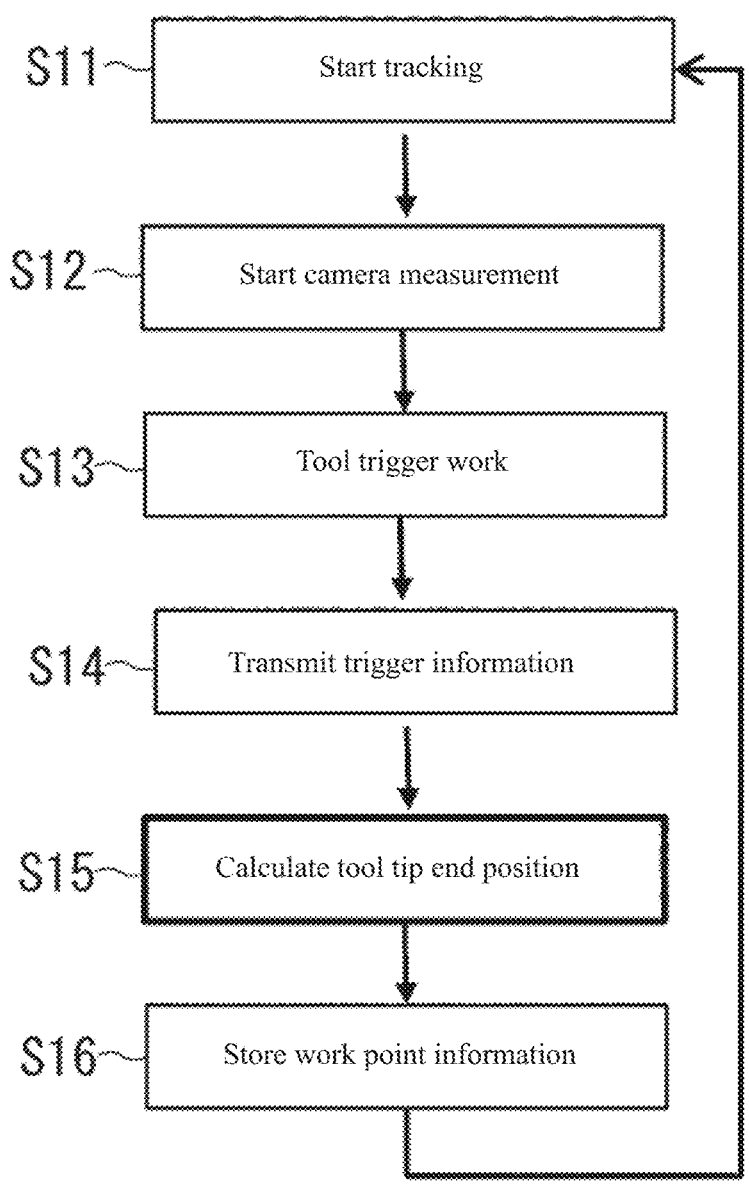
FIG. 3 is a work management flowchart relating to a work management method according to the first embodiment.

Next, work management in the work management system 1 will be described. FIG. 3 is a work management flowchart relating to a work management method according to the first embodiment.

When work management of the work management system 1 is started, first, in Step S11, the control unit 33 of the camera unit 3 commands the surveying instrument 4 to start tracking. In response to this, the tracking unit 41 starts automatic tracking of the prism 36 of the camera unit 3, and locks on to the prism 36. When the position of the camera unit 3 is fixed, continuation of automatic tracking is optional.

Concurrently with Step S11, in Step S12, the control unit 33 of the camera unit 3 starts the camera 31 and starts a measurement of the work site, and starts acquisition of camera posture information by starting the posture detecting device 32.

Here, in Step S13, a worker operates the trigger switch 21 and uses the tool 2.

Then, the processing shifts to Step S14, and the communication unit 22 of the tool 2 transmits trigger information to the camera unit 3. The trigger information may be any information from which ON/OFF of the operation of the tool can be detected. For example, information such as (i) a signal at the time of switching from ON to OFF, (ii) a signal averaging the duration of switching from ON to OFF, or (iii) a signal locus of switching from ON to OFF, is transmitted.

Upon receiving the trigger information, the processing shifts to Step S15, and the control unit 33 of the camera unit 3 calculates position coordinates (XT, YT, ZT) of a tip end position of the tool 2 by a method described later in FIG. 4.

Next, the processing shifts to Step S16, and the control unit 33 of the camera unit 3 defines the position coordinates calculated in Step S15 as a work position (work point) at which the worker has performed a work in Step S13, and stores the position coordinates (XT, YT, ZT) of the work point and information showing that the work has been performed (hereinafter, collectively referred to as "tool tip end position information") in the storage unit 34. Then, the processing returns to Step S11, and until the work management is determined to be ended, Steps S11 to S16 are repeated.

Figure 4:
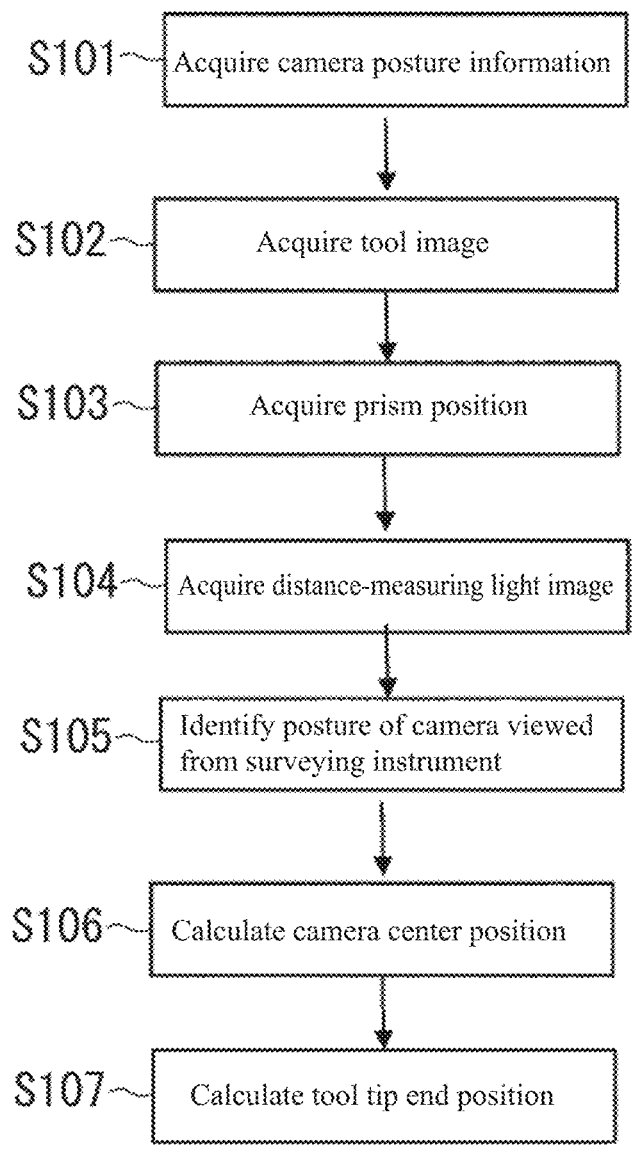
FIG. 4 is a calculation flowchart of a tool tip end position in the same work management method.

FIG. 4 is a calculation flowchart of the tool tip end position in the work management method described above. However, the next Steps S101 to S103 are performed in random order, and information is acquired in parallel with each other.

Upon receiving the trigger information, the control unit 33 of the camera unit 3 shifts the processing to Step S101, and acquires camera posture information of the camera unit 3 from the posture detecting device 32.

In Step S102, the control unit 33 of the camera unit 3 acquires tool images of the tool 2 from the camera 31, and analyzes the tool images (for example, stereo matching by point correspondence between a first camera image and a second camera image) to acquire a tip end position of the tool 2, that is, when the tool is a reinforcement restraining machine, a position of a restraining unit as camera coordinates (xT, yT, zT). Shape information of the tool 2 and information on a portion defined as the tip end position are identified in advance and stored in the storage unit 34.

In Step S103, the control unit 33 of the camera unit 3 requests position information of the prism 36 from the surveying instrument 4. In response to this, the surveying instrument 4 transmits distance-measuring light to the position of the prism 36 that the surveying instrument 4 has locked on by automatic tracking and detects horizontal and vertical rotation angles at this time, and acquires position coordinates (Xp, Yp, Zp) of the prism 36 and transmits the position coordinates to the camera unit 3.

Here, those desired to be finally obtained are position coordinates (XT, YT, ZT) of the tip end position of the tool 2. For this, through Step S102, the camera coordinates (xT, yT, zT) of the tip end position of the tool 2 are found, position coordinates (Xp, Yp, Zp) of the prism 36 positioned on the camera unit 3 are found, and an offset distance (L) between the camera coordinate system center of the camera 31 and the center of the prism 36 is stored in the storage unit 34.

Through simple deduction, the position coordinates (Xc, Yc, Zc) of the camera coordinate system center are found by shifting from the position coordinates (Xp, Yp, Zp) of the prism 36 by the offset distance (L), and position coordinates (XT, YT, ZT) of the tool tip end position are found by converting the camera coordinates (xT, yT, zT) of the tool tip end position into position coordinates.

Figure 5:
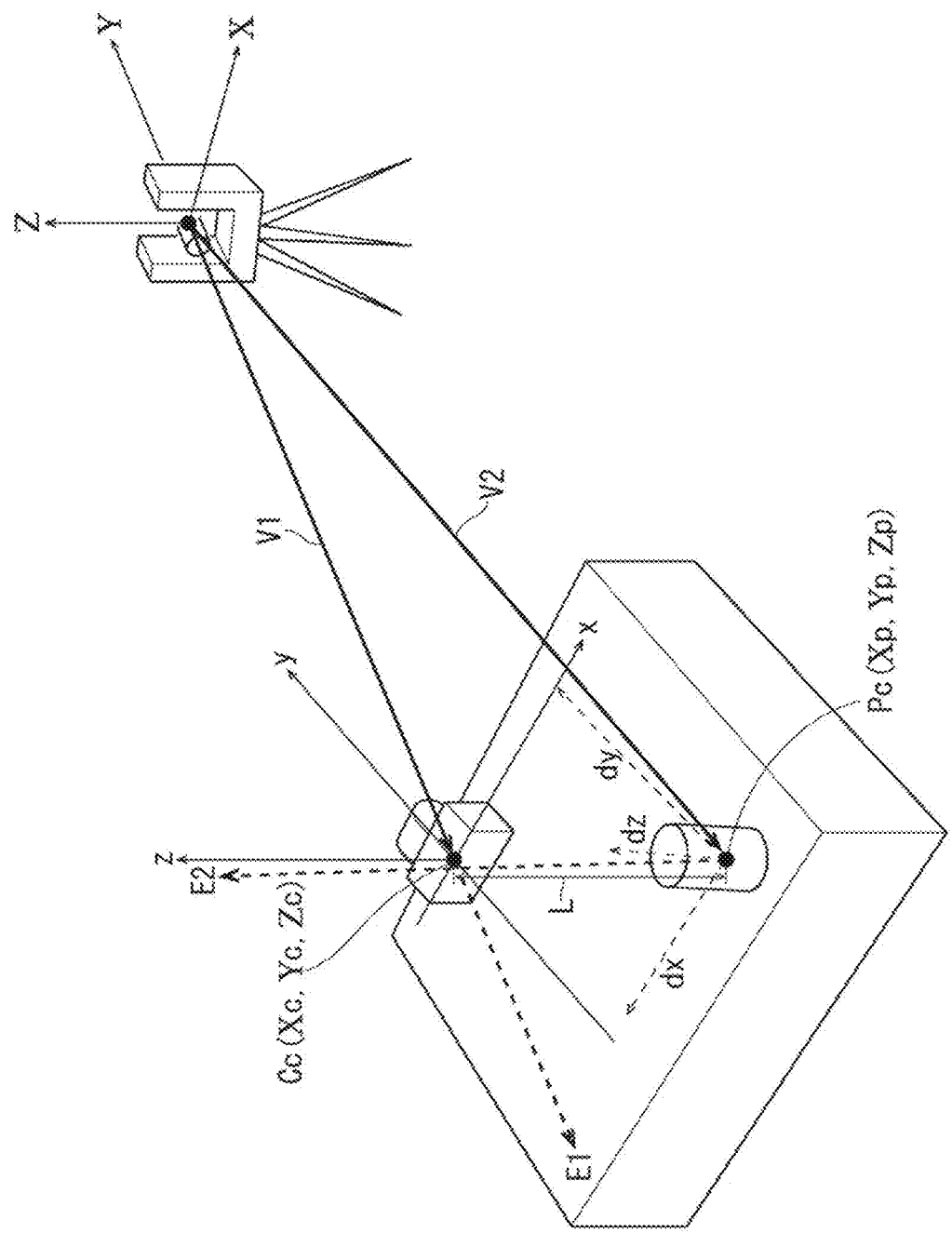
FIG. 5 is a concept image view for obtaining position coordinates of the tool tip end position.

However, which the shifting direction of the offset distance (L) should be performed in terms of the 3D absolute coordinate system (the coordinate system of the surveying instrument 4) differs depending on the posture of the camera unit 3 and the orientation of the camera unit 3 as viewed from the surveying instrument 4. FIG. 5 is a concept image view for obtaining position coordinates of the tool tip end position. Description will be given on the assumption that, in the camera unit 3, there are distances (dx, dy, dz), that is, an offset distance (L) synthesizing the distances, between the center of the prism 3 (hereinafter, referred to as "prism center Pc") and the center of the camera 31 (camera coordinate system center, hereinafter, referred to as "camera coordinate system center Cc").

To obtain position coordinates (XT, YT, ZT) of the tool tip end position, it is first necessary to obtain position coordinates (Xc, Yc, Zc) of the camera coordinate system center Cc. Obtaining position coordinates (Xc, Yc, Zc) of the camera coordinate system center Cc is to obtain a vector V1 from the surveying instrument 4 to the camera coordinate system center Cc. Here, through Step S103, a vector V2 from the surveying instrument 4 to the prism center Pc is found from the position coordinates (Xp, Yp, Zp) of the prism center Pc. The distances (dx, dy, dz) of the offset distance (L) depend on the camera coordinate axes, so that with respect to a direction vector E1 to the camera coordinate system center Cc viewed from the surveying instrument 4, by obtaining camera posture information around the direction vector E1, a shifting direction of the offset distance (L) is determined. That is, by obtaining orientation information of the camera unit 3 and posture information of the camera unit 3, a shifting direction vector E2 of the offset distance (L) is obtained. Accordingly, by shifting from the vector V2 from the surveying instrument 4 to the prism center Pc by the offset distance (L) in the direction of the shifting direction vector E2, the vector V1 from the surveying instrument 4 to the camera coordinate system center Cc is obtained.

Therefore, in Steps S104 and S105, an orientation of the camera unit 3 viewed from the surveying instrument 4 is identified. In Step S104, the control unit 33 of the camera unit 3 acquires an image of the camera 31, and acquires a light image to analyze which position the luminescence of the distance-measuring light in Step S103 has been captured in the image (the light image may be the tracking light in Step S11).

Next, in Step S105, the control unit 33 of the camera unit 3 performs image analysis of the light image acquired in Step S104. In a camera image, a luminous point Tc (light exit point from the telescope 4c, refer to FIG. 1) of the distance-measuring light (or tracking light) appears as a white point with a large amount of light received, and is extracted by grayscale image processing, etc. The control unit 33 of the camera unit 3 identifies a direction of the surveying instrument 4 with respect to the camera unit 3 (an orientation of the camera unit 3 viewed from the surveying instrument 4) from the position of the luminous point Tc in the image.

Next, the control unit 33 of the camera unit 3 calculates position coordinates (Xc, Yc, Zc) of the camera coordinate system center Cc in Step S106. The control unit 33 of the camera unit 3 obtains the camera posture information identified in Step S101 and the orientation information of the camera unit 3 identified in Step S105 and obtains the shifting direction vector E2 from the prism center Pc to the camera coordinate system center Cc, and calculates position coordinates (Xc, Yc, Zc) of the camera coordinate system center Cc by shifting from the position coordinates (Xp, Yp, Zp) of the prism center Pc by the offset distance (L) in the shifting direction vector E2.

Next, in Step S107, the control unit 33 of the camera unit 3 converts camera coordinates of the tool image into position coordinates based on the position coordinates (Xc, Yc, Zc) of the camera coordinate system center Cc calculated in Step S106. Specifically, by converting the camera coordinates (xT, yT, zT) of the tool tip end position acquired in Step S102, position coordinates (XT, YT, ZT) of the tool tip end position are calculated.

As described above, according to the present embodiment, the work management system 1 automatically measures a position at which the worker has performed a work with the tool, that is, position coordinates (XT, YT, ZT) of the tool tip end position in real time, and stores the measured position coordinates. Therefore, re-measurement for an inspection is not necessary, so that the workloads on the designer, the builder, and the worker are reduced. In addition, the work management system 1 stores all work points as digital information, so that it becomes easy for a builder to grasp the work performance volume and utilize the evidence of work records, and a designer gains benefits of inspection quality improvement not by sampling inspection but by 100% inspection. In addition, data stored in the storage unit 34 of the camera unit 3 can be output to an external system, and remote management by the external system is possible. Therefore, the workloads on the designer, the builder, and the worker can be significantly reduced.

According to the present embodiment, when using the work management system 1, a worker can perform a conventional work with a conventional tool, and the system is easily introduced.

In addition, according to the present embodiment, the work management system 1 is a system to acquire position information with respect to a work point, so that even an object that is difficult to measure by reflected light reception by a laser scanner, etc., such as a transparent member including a window glass, etc., and a small member with a small area including light-gauge steel, etc., can be reliably measured. The work management system 1 according to the present embodiment is higher in accuracy than a system that acquires position information from a GPS satellite, and can make an accurate measurement even at a work site (closed space) shielded by walls and a ceiling that is hard for a GPS satellite to measure and even at a work site that disturbance noise light easily enters, such as an urban area.

Second Embodiment

Configuration of Work Management System According to Second Embodiment

Figure 6:
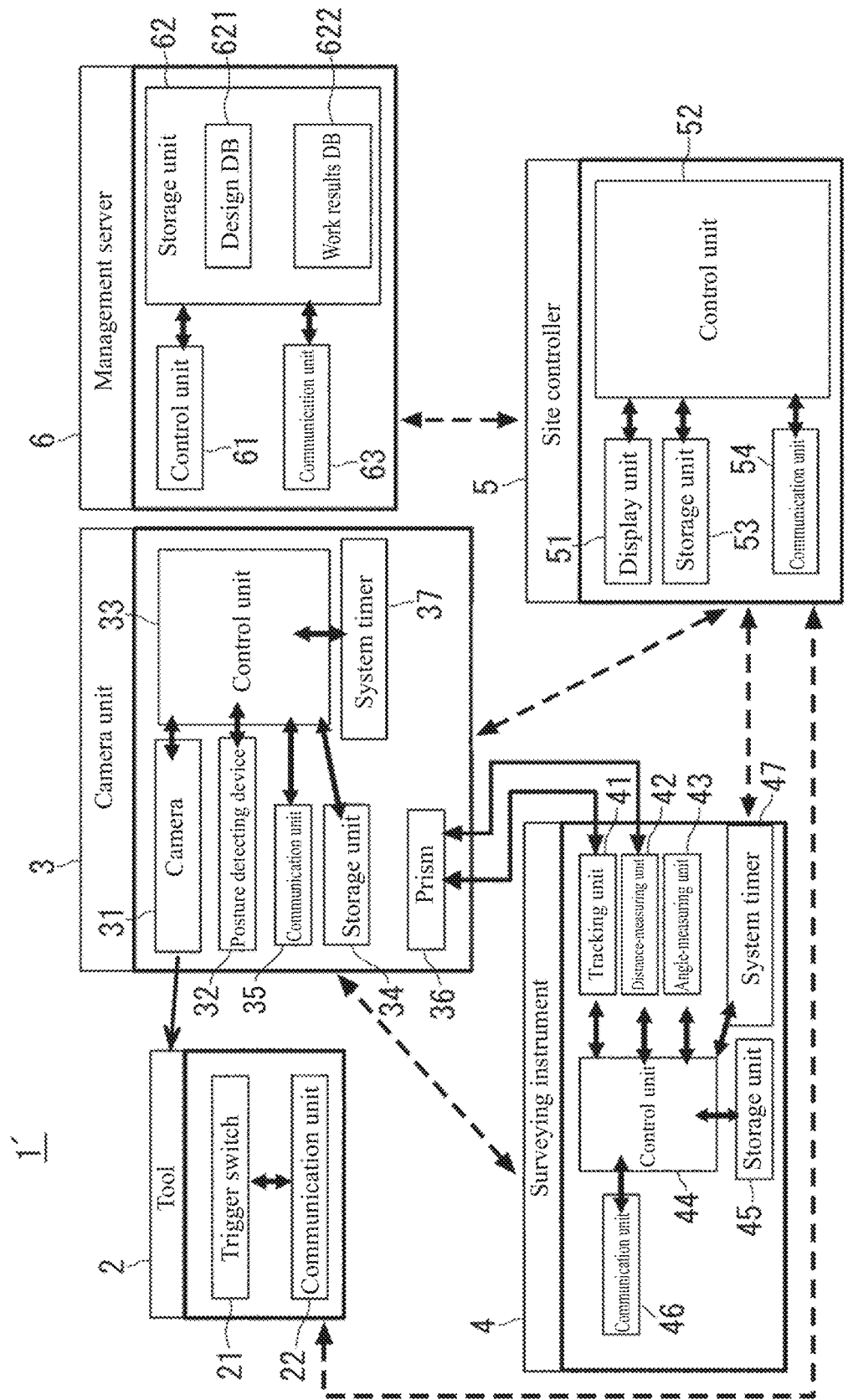
FIG. 6 is a configuration block diagram of a work management system according to a second embodiment.

FIG. 6 is a configuration block diagram of a work management system 1' according to a second embodiment. The same components as those in the first embodiment are provided with the same reference signs, and descriptions of these are omitted. As illustrated in FIG. 6, the work management system 1' of the present embodiment includes a tool 2, a camera unit 3, a surveying instrument 4, a site controller 5, and a management server 6.

The tool 2 includes a trigger switch 21 and a communication unit 22.

The camera unit 3 includes a camera 31, a posture detecting device 32, a control unit 33, a storage unit 34, a communication unit 35, a prism 36, and a system timer 37. The system timer 37 uses an operating clock of the CPU of the control unit 33 as an original oscillator, and acquires a current time (system time) of the camera unit 3 by calculating count values of a hardware timer and a software timer.

The surveying instrument 4 includes a tracking unit 41, a distance-measuring unit 42, an angle-measuring unit 43, a control unit 44, a storage unit 45, a communication unit 46, and a system timer 47. The system timer 47 uses an operating clock of the CPU of the control unit 44 as an original oscillator, and acquires a current time (system time) of the surveying instrument 4 by calculating count values of a hardware timer and a software timer. It is also preferable that the surveying instrument 4 further includes a GPS antenna, and acquires UTC and corrects the system time as appropriate.

The site controller 5 is a multifunctional mobile phone (smartphone), a tablet terminal, or a laptop computer, etc. The site controller 5 is operated by a worker at a work site. The site controller 5 includes at least a display unit 51, a control unit 52, a storage unit 53, and a communication unit 54 as illustrated in FIG. 6. The display unit 51 has a liquid crystal screen, and preferably enables a touch panel operation. The display unit 51 performs information provision or display by a technology such as a GUI (Graphical User Interface) so that the worker, etc., can visually recognize processing and results of the worker's work. The control unit 52 is, for example, a microcontroller, and consists of a CPU, a RAM, and a ROM, etc. The control unit 52 executes various application programs for process display, navigation display, and model display, and causes the display unit 51 to display a screen according to an application. The storage unit 53 consists of a storage medium such as, for example, a memory card, an HDD (Hard Disk Drive), etc.

The management server 6 includes at least a control unit 61, a storage unit 62, and a communication unit 63. The control unit 61 is, for example, a microcontroller, and consists of a CPU, a RAM, and a ROM, etc. The storage unit 62 consists of a fixed disk device such as an HDD (Hard Disk Drive) or a storage means such as an SSD (Solid State Drive). The storage unit 62 includes a design database 621 and a work results database 622. In the design database 621, design data of construction works at a work site based on design BIM (data showing each construction member constituting architecture by 3D model shapes. The 3D model includes surface, line, and point shapes.) are stored. The design database 621 stores at least a design table that is related to each construction member and member identification information (member ID), member coordinates, and a member shape are associated with each other. The work results database 622 stores tool tip end position information. The work results database 622 stores at least a tool tip end position information table in which tool tip end position information (position coordinates of a work point and information showing that a work has been performed) is stored in association with a time and a member ID and member coordinates in the design database.

In the configuration described above, the tool 2 transmits trigger information of the trigger switch 21 through the communication unit 22. The surveying instrument 4 transmits position coordinates of the prism 36 to the camera unit 3 through the communication unit 46. The site controller 5 requests work information from the management server 6 and receives the work information through the communication unit 54. The site controller 5 sends out commands to the camera unit 3 and the surveying instrument 4 and receives information through the communication unit 54. It is preferable that radio communication between the site controller 5 and the management server 6 uses internet communication, but is not limited to this. Radio communications between the site controller 5 and the camera unit 3 and between the site controller 5 and the surveying instrument 4 can use a wireless LAN and Bluetooth (registered trademark), but are not limited to these.

Work Management Method According to Second Embodiment

Figure 7:
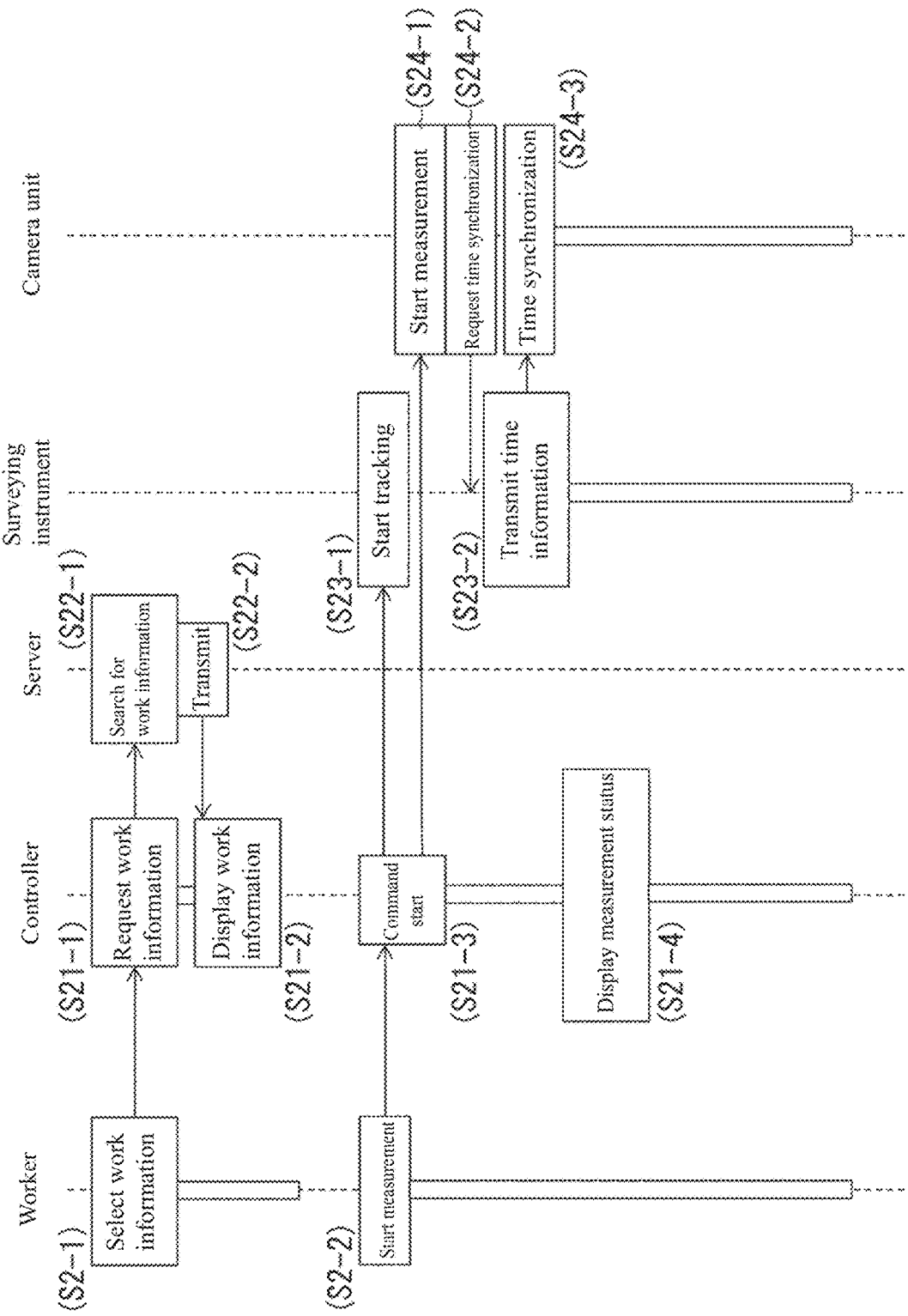
FIG. 7 is a flowchart of a work management method (management start processing) according to the second embodiment.

Next, work management in the work management system 1' will be described. FIG. 7 is a flowchart of a work management method (management start processing) according to the second embodiment.

(Management Start Processing)

When a worker operates the site controller 5 and selects work information (a shape of a member to be constructed, construction details, etc.) on the controller (Step S2-1), the site controller 5 requests details of the selected work information from the management server 6 (Step S21-1). In response to this, the management server 6 searches for corresponding work information from the design database 621 (Step S22-1), and transmits the work information to the site controller 5 (Step S22-2). In response to this, the site controller 5 displays the work information on the display unit 51 (Step S21-2). This display is navigation display by GUI, and the worker confirms the work information on the display unit 51 and prepares for the construction.

Next, the worker starts measurements for management by operating the site controller 5 (Step S2-2). In response to this, the site controller 5 commands the surveying instrument 4 and the camera unit 3 to start measurements (Step S21-3). In response to this, the surveying instrument 4 starts automatic tracking of the prism 36 (Step S23-1), and the camera unit 3 starts a measurement by the camera 31 and a measurement by the posture detecting device 32 (Step S24-1).

At this time, preferably, the camera unit 3 requests the surveying instrument 4 to perform time synchronization (Step S24-2). In response to this, the surveying instrument 4 transmits time information of the system timer 47 to the camera unit 3 (Step S23-2). Upon receiving the time information, the camera unit 3 calculates a communication delay and, when there is a time lag with the time of the system timer 47, performs time synchronization by time correction (Step S24-3).

The site controller 5 displays a status during the measurement on the display unit 51 (Step S21-4). This display is process display by GUI, and displays that, for example, the surveying instrument 4 is continuing tracking, and the camera 31 and the posture detecting device 32 of the camera unit 3 are making measurements.

(Processing When Operating Tool)

Figure 8:
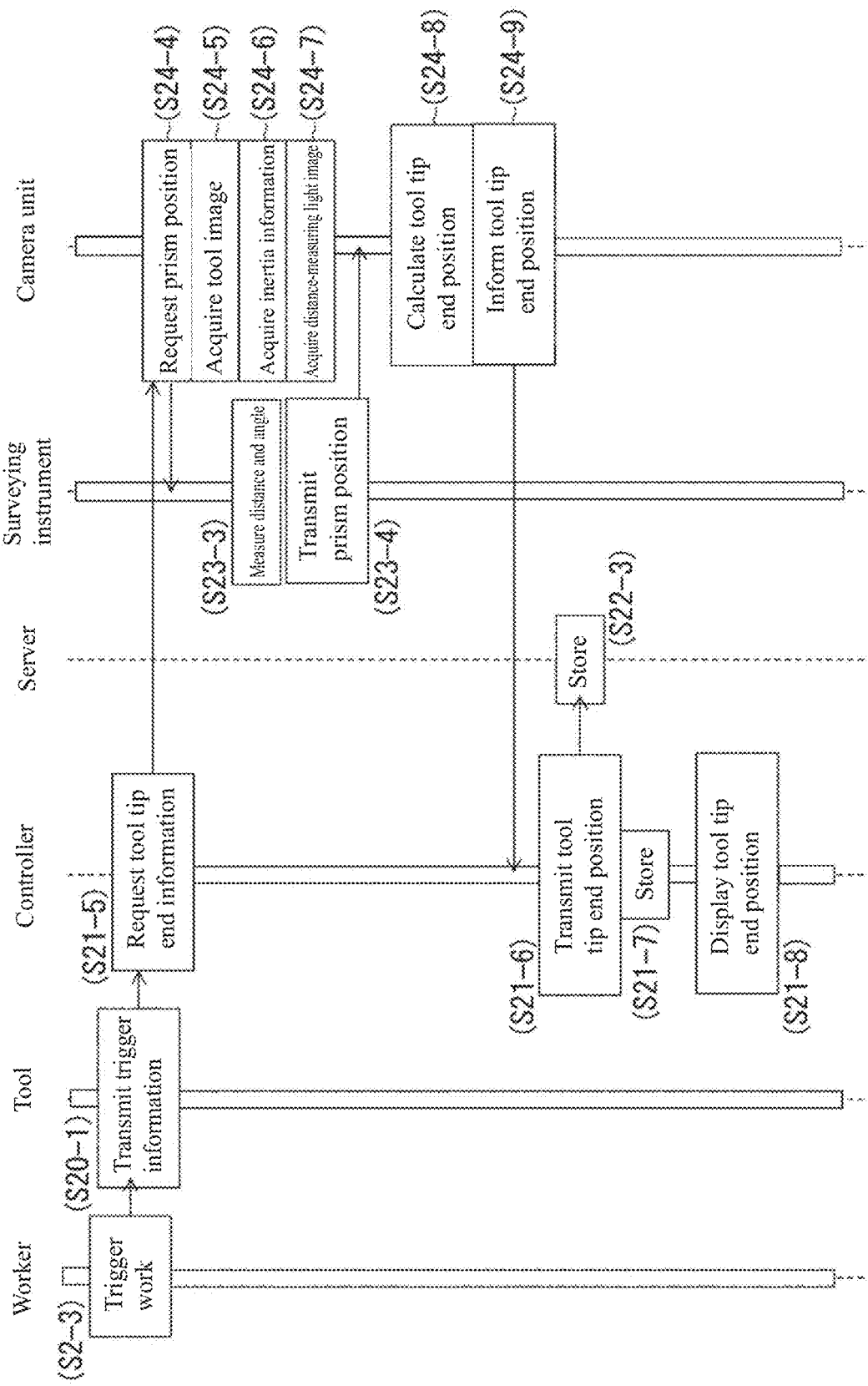
FIG. 8 is a flowchart of the work management method (processing when operating the tool) according to the second embodiment.

Next, work management when the tool 2 is used by the worker after the management start processing (FIG. 7) will be described. FIG. 8 is a flowchart of a work management method (processing when operating the tool) according to the second embodiment.

The worker operates the trigger switch 21 provided on the tool 2 (Step S2-3. For example, to fix a main reinforcement and a hoop reinforcement at the position of the circle R in FIG. 1 by a binding band, the worker performs work to turn ON the trigger switch of the reinforcement restraining machine, wind the binding band around the position, and turn OFF the trigger switch). In response to this, the tool 2 transmits trigger information to the site controller 5 (Step S20-1). In response to this, the site controller 5 requests a tool tip end position from the camera unit 3 (Step S21-5). The trigger information from the tool 2 may be directly received by the camera unit 3.

Upon receiving the request, the camera unit 3 requests position information of the prism 36 from the surveying instrument 4 (Step S24-4), requests a tool image from the camera 31 and acquires the image (Step S24-5), and requests camera posture information from the posture detecting device 32 and acquires the information (Step S24-6). The surveying instrument 4 measures a distance and an angle to the prism 36 (Step S23-3), and transmits position coordinates of the prism 36 to the camera unit 3 (Step S23-4). The camera unit 3 requests a light image from the camera 31 and acquires the image (Step S24-7).

The camera unit 3 calculates position coordinates of the tool tip end position from camera coordinates of the tool tip end position obtained from the tool image, the camera posture information, the position coordinates of the prism 36 measured by the surveying instrument 4, and orientation information of the camera unit 3 viewed from the surveying instrument 4 obtained from the light image (Step S24-8). Then, the camera unit 3 informs the site controller 5 of the tool tip end position information (Step S24-9).

In response to this, the site controller 5 transmits the tool tip end position information to the management server 6 (Step S21-6). The management server 6 stores the tool tip end position information in the work results database 622 (Step S22-3. At this time, unless connection for the internet communication is established, Steps S21-6 and S22-3 may be omitted). The site controller 5 stores the tool tip end position information in the storage unit 53 (Step S21-7). The site controller 5 displays the tool tip end position information on the display 51 (Step S21-8). This display is preferably a display (model display) performed by superimposing the tool tip end position information on a design BIM model based on design data acquired from the management server 6. Measurement status display (process display) or navigation display for guide to a next work point is also preferably performed.

(Management End Processing)

Figure 9:
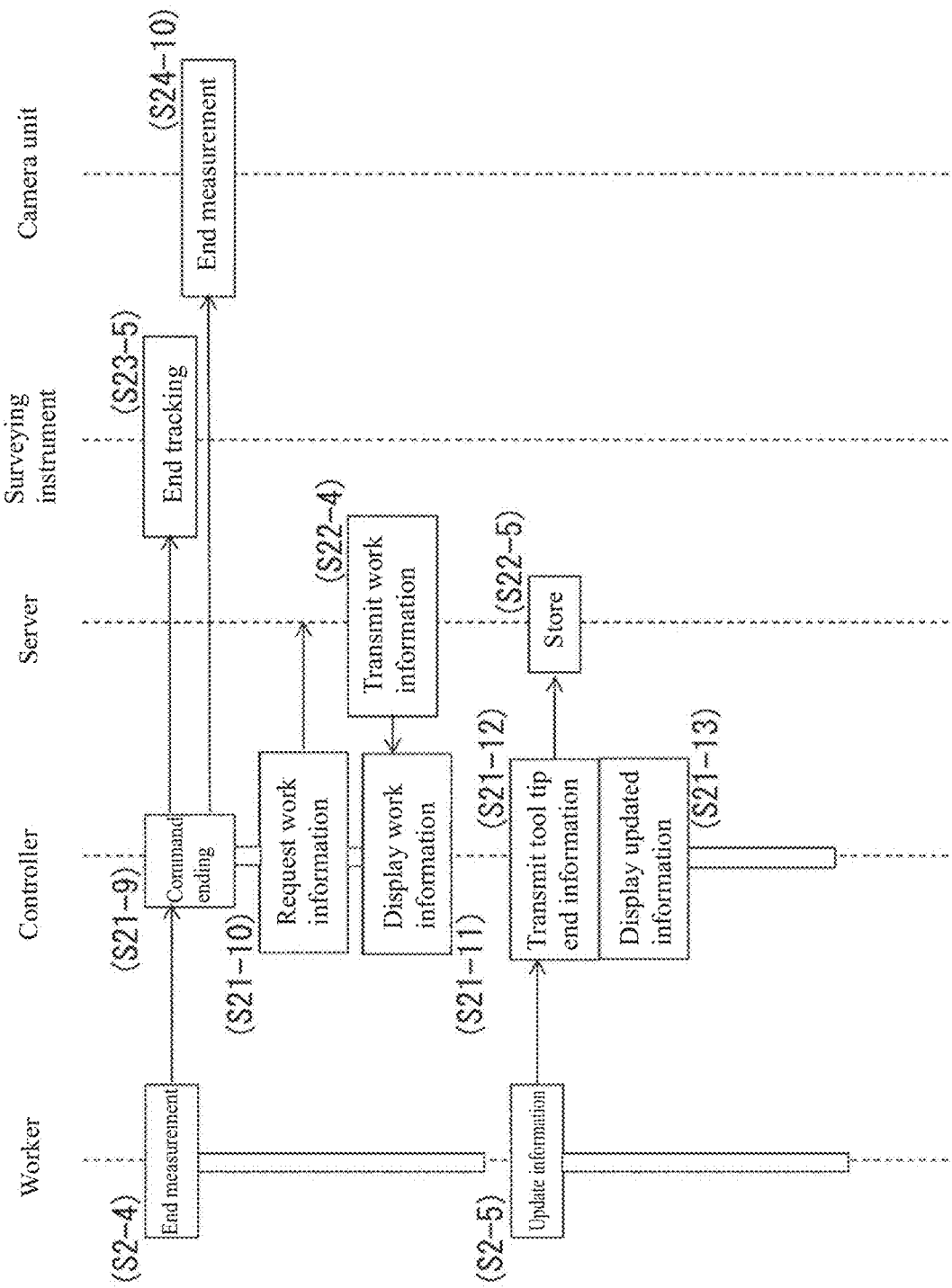
FIG. 9 is a flowchart of the work management method (management end processing) according to the second embodiment.

Next, work management when ending the work management will be described. FIG. 9 is a flowchart of a work management method (management end processing) according to the second embodiment.

The worker ends measurements by operating the site controller 5 (Step S2-4). The site controller 5 commands the surveying instrument 4 and the camera unit 3 to end measurements (Step S21-9). In response to this, the surveying instrument 4 ends automatic tracking of the prism 36 (Step S23-5), and the camera unit 3 ends measurements by the camera 31 and the posture detecting device 32 (Step S24-10). The site controller 5 requests work information from the management server 6 again (Step S21-10), and the management server 6 transmits work information to the controller 5 again (Step S22-4). In response to this, the site controller 5 displays the work information on the display unit 51 (Step S21-11). The worker confirms the work information on the display unit 51, and confirms whether to end the work. This display is a navigation display by GUI, and is preferably for confirming whether there is any unfinished work.

The worker who has determined to end the work updates performed work information by operating the site controller 5 (Step S2-5). In response to this, the site controller 5 transmits all of acquired tool tip end position information to the management server 6 (Step S21-12). The management server 6 stores the tool tip end position information in the work results database 622 (Step S22-5). The site controller 5 displays, as updated information, the tool tip end position information transmitted to the management server 6 on the display unit 51, and ends the work management (Step S21-13).

As described above, the same effects as those in the first embodiment can also be obtained by the work management system 1' of the present embodiment. In the present embodiment as well, data stored in the storage unit 62 of the management server 6 can be transmitted to an external system, and remote management from the external system is possible.

Further, according to the work management system 1' of the present embodiment, work information is managed by the site controller 5, and whether a work has been completed at a position requiring the work is visually displayed in real time on the site controller 5, so that a worker can easily grasp the work information, and can smoothly make a work report.

In addition, according to the work management system 1' of the present embodiment, information in the work results database 622 is linked to design BIM, so that a builder and a designer can confirm the actual state at the site against design BIM in a timely manner.

According to the present embodiment, by navigation of the site controller 5, a worker can efficiently proceed with a work in a comprehensive way. In addition, a worker is guided to confirm the work by the site controller 5, so that when there is work that was forgotten or a mistake error in the work position, the worker can perform the work again on the spot.

Preferred Modifications of Embodiments

Next, preferred modifications of the embodiments described above will be described.

(Modification 1)

Figure 10:
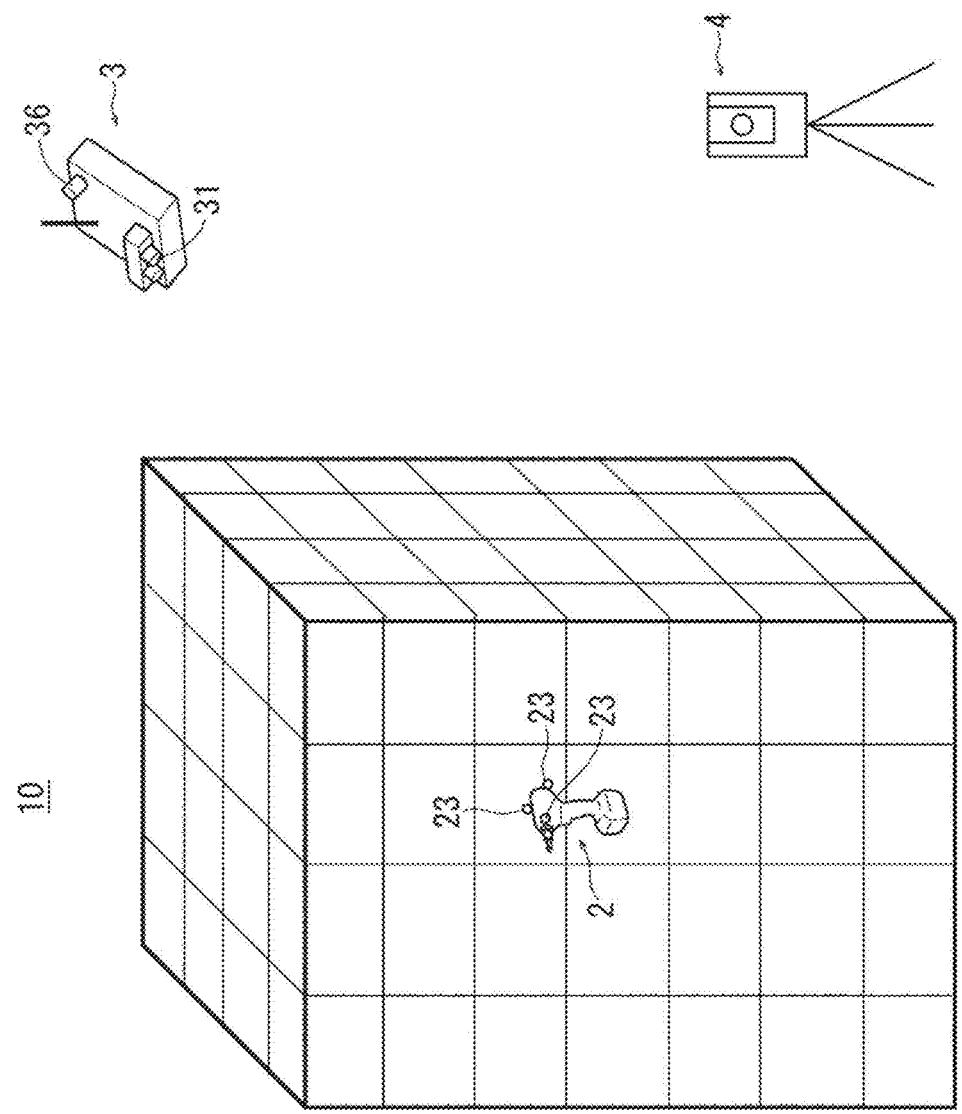
FIG. 10 is a view illustrating a state where a work management system according to Modification 1 is disposed.

FIG. 10 is a view illustrating a state where a work management system 10 according to Modification 1 is disposed. Although description will be given by applying Modification 1 to the first embodiment, Modification 1 may be applied to the second embodiment as well. The same components as those in the first embodiment are provided with the same reference signs, and descriptions of these are omitted. In Modification 1, calculation of camera coordinates of a tool tip end position from a tool image in Step S102 (FIG. 4) in the first embodiment is performed by capturing motions of the tool 2.

The tool 2 includes a trigger switch 21, a communication unit 22, and further, reflectors for motion capture (hereinafter, referred to as "reflection markers") 23. The reflection markers 23 are disposed at least, for example, at three positions on the tool 2 as illustrated in FIG. 10. Relative position information of the reflection markers 23 and the tool tip end position is stored in advance in the storage unit 34.

In Modification 1, in Step S102, the control unit 33 of the camera unit 3 acquires camera coordinates of the respective reflection markers 23 from a tool image acquired by the camera 31, and acquires camera coordinates (xT, yT, zT) of the tool tip end position from the camera coordinates of the respective reflection markers 23. In Modification 1 as well, effects equivalent to those of the embodiment can be obtained.

(Modification 2)

Figure 11:
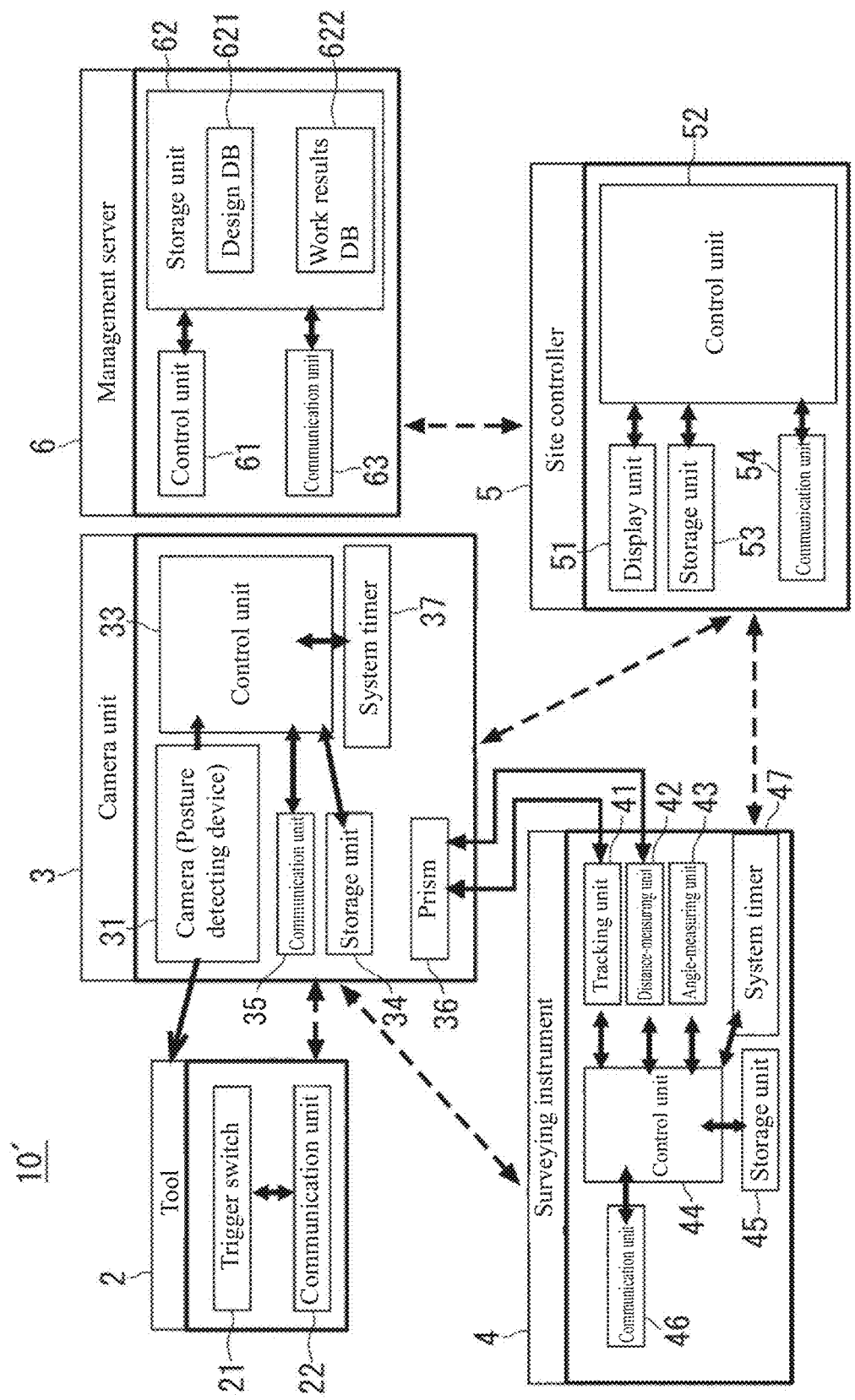
FIG. 11 is a configuration block diagram of a work management system according to Modification 2.

FIG. 11 is a configuration block diagram of a work management system 10' according to Modification 2. Although description will be given by applying Modification 2 to the second embodiment, Modification 2 may be applied to the first embodiment as well. The same components as those in the second embodiment are provided with the same reference signs, and descriptions of these are omitted. In Modification 2, the "camera posture information" is acquired not by an inertial measurement unit but from an image of the camera 31. Therefore, as illustrated in FIG. 11, the camera 31 serves as a posture detecting device in Modification 2.

As with the embodiment, from a light image of distance-measuring light (or tracking light), an orientation of the camera unit 3 viewed from the surveying instrument 4, that is, a direction vector E1 (refer to FIG. 5) to the camera coordinate system center Cc viewed from the surveying instrument 4 can be identified. However, camera coordinate axes around the direction vector E1 are unknown when no inertial measurement unit is provided.

Figure 12:
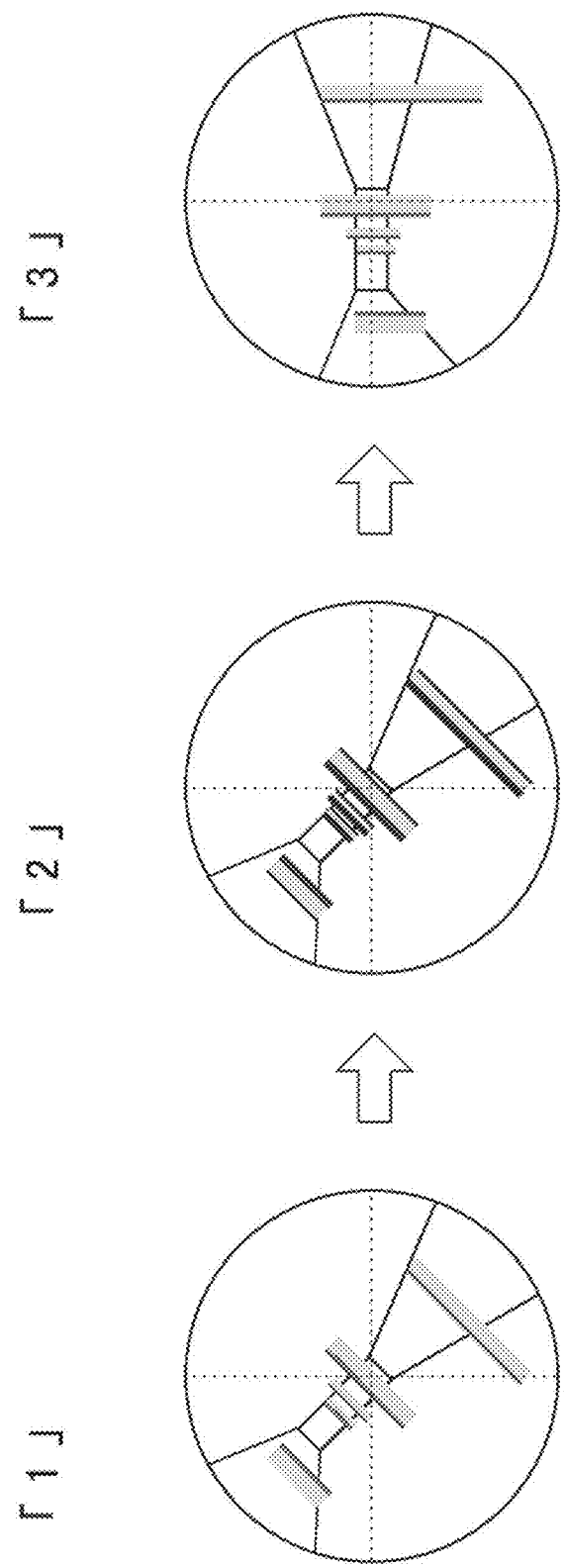
FIG. 12 is a work image view for camera posture information acquisition according to Modification 2.

Therefore, in Modification 2, according to an image imaged by the camera 31, camera coordinate axes around the direction vector E1 are determined. FIG. 12 is a work image view for camera posture information acquisition according to Modification 2. As illustrated in "1" of FIG. 12, when the camera unit 3 tilts, a site image of the work site imaged by the camera 31 includes the tilt of the camera unit 3, so that the vertical direction in the site image is different from the actual vertical direction. As illustrated in "2" of FIG. 12, the control unit 33 of the camera unit 3 applies a Sobel filter (spatial first derivation) to the site image to extract edges (vertical line), and grasps the vertical direction in the image. For assisting edge extraction, an inertial measurement unit may be used or design data of design BIM may be referred to. When the vertical direction in the image is found, as illustrated in "3" of FIG. 12, from a difference from the vertical axis of the 3D absolute coordinate system, camera posture information can be acquired. In Modification 2 as well, effects equivalent to those of the embodiment can be obtained. Further, in Modification 2, an inertial measurement unit as a posture detecting device may be an optional component.

(Modification 3)

Figure 13:
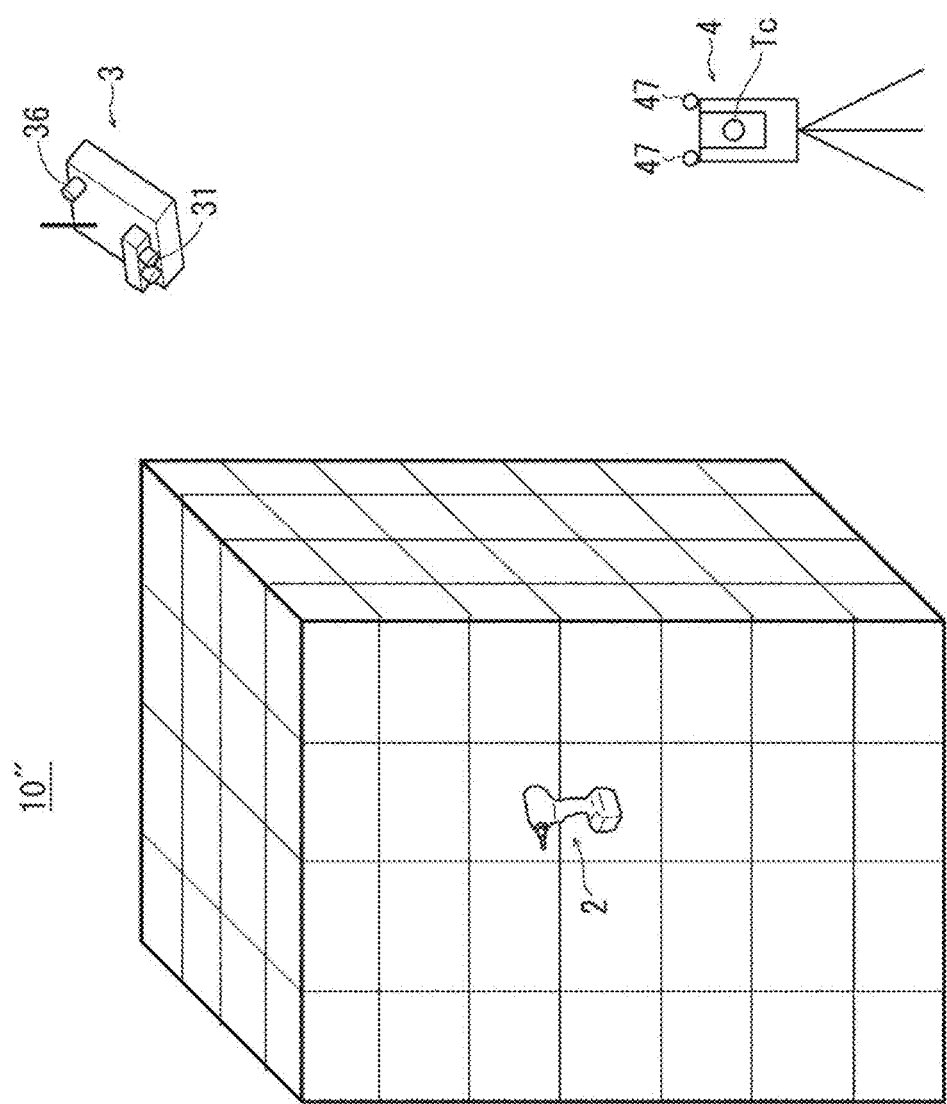
FIG. 13 is a view illustrating a state where a work management system according to Modification 3 is disposed.
Figure 14:
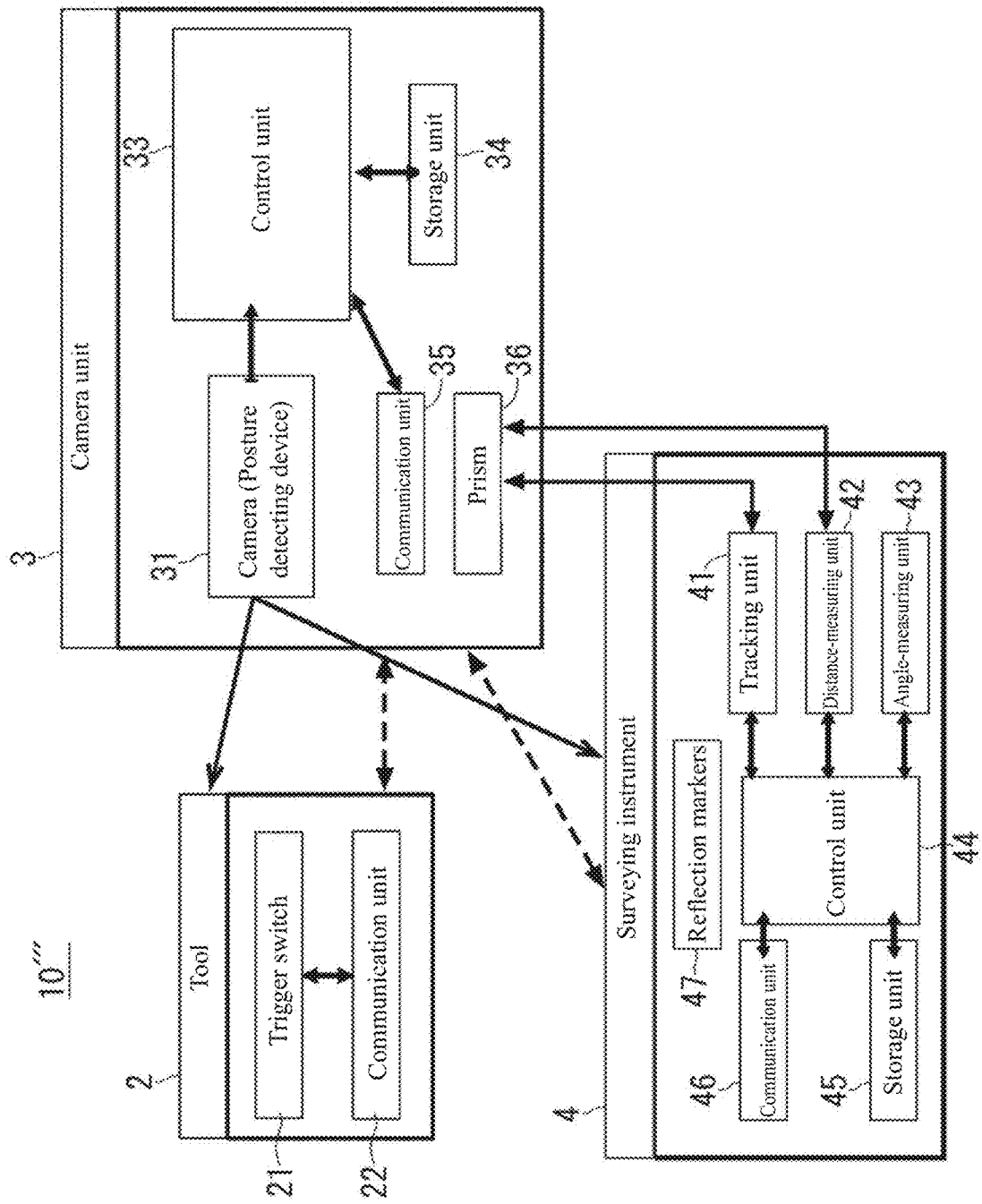
FIG. 14 is a configuration block diagram of the same work management system.

FIG. 13 is a view illustrating a state where a work management system 10" according to Modification 3 is disposed, and FIG. 14 is a configuration block diagram of the same work management system 10". Although description will be given by applying Modification 3 to the first embodiment, Modification 3 may be applied to the second embodiment as well. The same components as those in the first embodiment are provided with the same reference signs, and descriptions of these are omitted. In Modification 3, "camera posture information" and "orientation information" are acquired by capturing motions of the surveying instrument 4.

In Modification 3, the surveying instrument 4 further includes reflection markers 47. The reflection markers 47 are disposed at least at two positions on the telescope 4c or the bracket portion 4b of the surveying instrument 4. Relative position information of the reflection markers 47 and the luminous point Tc (light exit point from the telescope 4c) of distance-measuring light (tracking light) is stored in advance in the storage unit 34.

In Modification 3, the control unit 33 of the camera unit 3 acquires camera coordinates of the respective reflection markers 47 and camera coordinates of the luminous point Tc from a light image acquired by the camera 31. Then, the control unit acquires camera posture information by calculating tilts of the camera coordinate axes with respect to the 3D absolute coordinate axes from the camera coordinates of the three points including the reflection markers 47 and the luminous point Tc. As with the embodiment, orientation information of the camera unit 3 viewed from the surveying instrument 4 can be obtained from the camera coordinates of the luminous point Tc, so that in Modification 3 as well, effects equivalent to those of the embodiment can be obtained. Further, in Modification 3, as illustrated in FIG. 14, an inertial measurement unit as a posture detecting device may be an unnecessary component.

(Modification 4)

Figure 15:
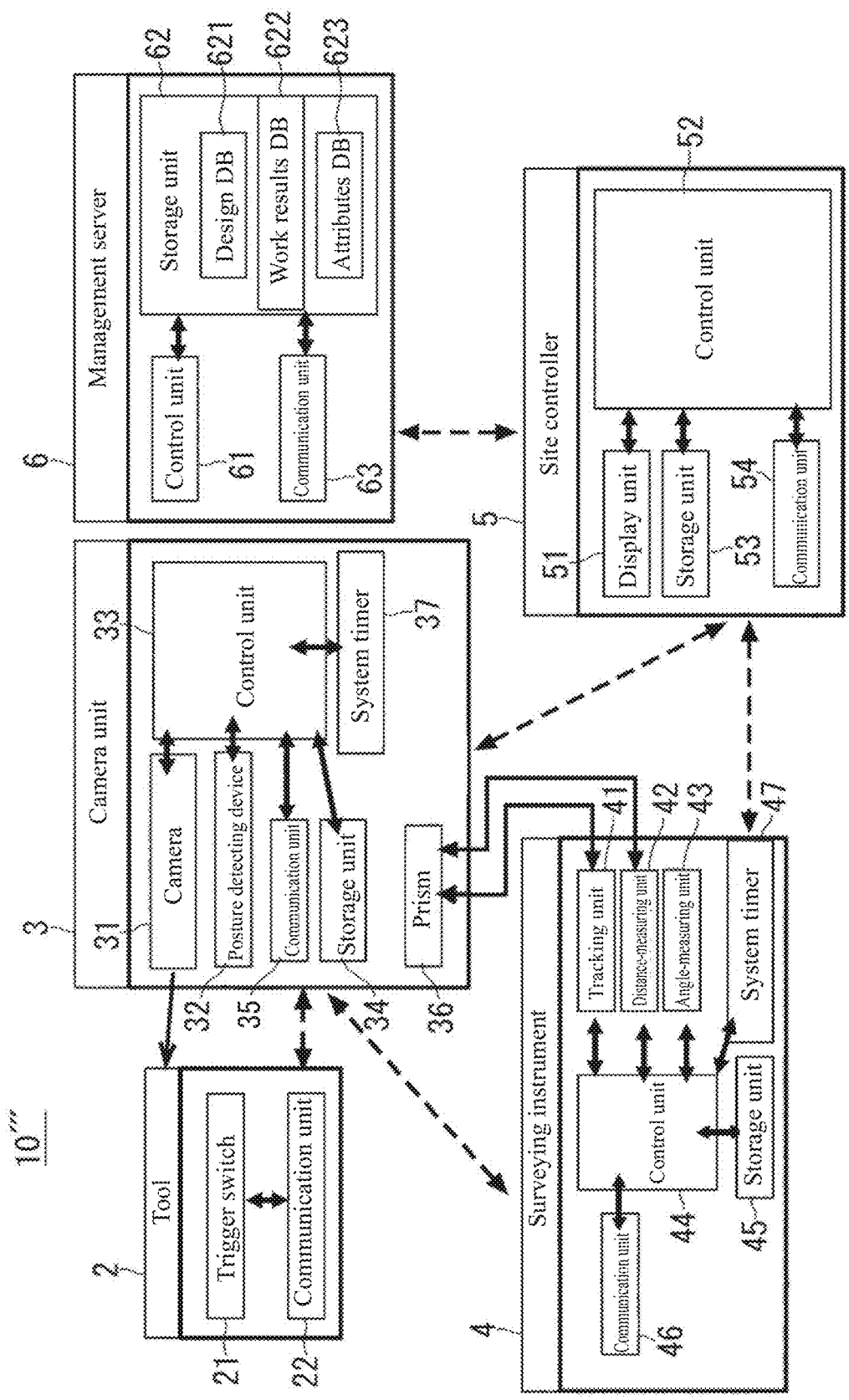
FIG. 15 is a configuration block diagram of a work management system according to Modification4.

FIG. 15 is a configuration block diagram of a work management system 10''' according to Modification 4. Although description will be given by applying Modification 4 to the second embodiment, Modification 4 may be applied to the first embodiment as well. The same components as those in the second embodiment are provided with the same reference signs, and descriptions of these are omitted.

In Modification 4, the management server 6 further includes an attributes database 623 in the storage unit 62.

The attributes database 623 stores work attributes information. The attributes database 623 stores a work attributes table storing identification information of a worker (worker's name or worker ID), tool information (the kind of tool, a tool ID, tool shape information, and information on position defined as a tip end position of the tool) in association with tool tip end position information stored in the work results database 622. In Modification 4, before the management start processing, a worker inputs worker identification information and tool information into the site controller 5. Each time a worker changes a tool or a worker is changed, the information is input into the site controller 5. According to Modification 4, attributes information is added to the tool tip end position information, so that an inspection and validation are performed in greater detail.

(Modification 5)

FIG. 16 is a view illustrating a state where a work management system 10'''' according to Modification 5 is disposed. Modification 5 enables simultaneous measurements of a plurality of tools 2S, 2T, and 2U. Although description will be given by applying Modification 5 to the second embodiment, Modification 5 may be applied to the first embodiment as well.

The tools 2S, 2T, and 2U respectively have identification features that can be imaged and identified by the camera 31. Identification features are, for example, colors of the respective tools different from each other, QR codes (registered trademark) attached, and the numbers of reflection markers for motion capture different from each other, etc. Preferably, as described in Modification 4, concerning the tools 2S, 2T, and 2U, a worker inputs worker identification information and tool information into the site controller 5 before the management start processing. The tools 2S, 2T, and 2U have identification features that can be imaged and identified by the camera 31, so that the camera unit 3 can calculate camera coordinates of a tool tip end position of each tool. According to Modification 5, operation of a plurality of tools can be simultaneously managed.

Although the preferred embodiments and modifications of the present invention have been described above, the above embodiments and modifications can be combined based on the knowledge of a person skilled in the art, and such combined embodiments are also included in the scope of the present invention.

REFERENCE SIGNS LIST

1, 1', 10, 10', 10'', 10''', 10'''': Work management system
2: Tool
21: Trigger switch
22: Communication unit
23: Reflection marker
3: Camera unit
31: Camera
32: Posture detecting device
33: Control unit
34: Storage unit
35: Communication unit
36: Prism
4: Surveying instrument
41: Tracking unit
42: Distance-measuring unit
43: Angle-measuring unit
44: Control unit
45: Storage unit
46: Communication unit
47: Reflection marker
5: Site controller
51: Display unit
52: Control unit
53: Storage unit
54: Communication unit
6: Management server
61: Control unit
62: Storage unit
621: Design database
622: Work results database
623: Attributes database
63: Communication unit

The invention claimed is:

1. A work management system comprising:
a tool including a communication unit and a trigger switch;
a camera unit including a communication unit, a camera capable of identifying 3D camera coordinates from an image, a posture detecting device configured to acquire camera posture information of the camera, a control unit configured to control the camera and the posture detecting device, and a prism; and
a surveying instrument including a communication unit, a tracking unit configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit,
wherein upon detection that the trigger switch has been used by communication from the tool, the camera unit collects camera posture information by the posture detecting device, a tool image by the camera, position coordinates of the prism measured by the surveying instrument, and orientation information of the camera unit viewed from the surveying instrument, and obtains and stores position coordinates of a tip end position of the tool.

2. A work management system comprising:
a tool including a communication unit and a trigger switch;
a camera unit including a communication unit, a camera capable of identifying 3D camera coordinates from an image, a posture detecting device configured to acquire camera posture information of the camera, a control unit configured to control the camera and the posture detecting device, and a prism;
a surveying instrument including a communication unit, a tracking unit configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit; a site controller including a communication unit, a display unit, a control unit, and a storage unit, and configured to be operated by a worker; and
a management server including a communication unit, a control unit, and a storage unit including a work results database,
wherein the site controller causes the surveying instrument to start automatic tracking by the tracking unit, causes the camera unit to start measurements by the camera and the posture detecting device, and acquires trigger information of the tool, and upon detection that the trigger switch has been used, requests position coordinates of a tip end position of the tool from the camera unit, and transmits and stores the position coordinates of the tip end position of the tool in the management server.

3. The work management system according to claim 1, wherein the camera unit obtains camera coordinates of a tip end position of the tool from the tool image, obtains position coordinates of a camera coordinate system center of the camera by shifting from position coordinates of the prism obtained by the surveying instrument by an offset distance between a center of the prism and the camera coordinate system center in a shifting direction obtained from the camera posture information and the orientation information of the camera unit, and obtains position coordinates of the tip end position of the tool by converting the camera coordinates of the tip end position of the tool into position coordinates based on the position coordinates of the camera coordinate system center.

4. The work management system according to claim 2, wherein the camera unit obtains camera coordinates of a tip end position of the tool from the tool image, obtains position coordinates of a camera coordinate system center of the camera by shifting from position coordinates of the prism obtained by the surveying instrument by an offset distance between a center of the prism and the camera coordinate system center in a shifting direction obtained from the camera posture information and the orientation information of the camera unit, and obtains position coordinates of the tip end position of the tool by converting the camera coordinates of the tip end position of the tool into position coordinates based on the position coordinates of the camera coordinate system center.

5. The work management system according to claim 1, wherein the camera unit acquires the orientation information of the camera unit by acquiring a light image of the distance-measuring light or the tracking light by the camera and performing image analysis of a luminous point in the light image.

6. The work management system according to claim 2, wherein the camera unit acquires the orientation information of the camera unit by acquiring a light image of the distance-measuring light or the tracking light by the camera and performing image analysis of a luminous point in the light image.

7. The work management system according to claim 1, wherein the camera unit acquires the camera posture information by an inertial measurement unit or by extracting a vertical line in an image of the camera and obtaining a vertical direction in the image.

8. The work management system according to claim 2, wherein the camera unit acquires the camera posture information by an inertial measurement unit or by extracting a vertical line in an image of the camera and obtaining a vertical direction in the image.

9. The work management system according to claim 1, wherein the camera unit acquires the camera posture information and the orientation information of the camera unit by capturing motions of reflection markers attached to the surveying instrument by the camera.

10. The work management system according to claim 2, wherein the camera unit acquires the camera posture information and the orientation information of the camera unit by capturing motions of reflection markers attached to the surveying instrument by the camera.

11. The work management system according to claim 3, wherein the camera unit obtains camera coordinates of the tip end position of the tool by stereo matching by the camera or by capturing motions of reflection markers attached to the tool by the camera.

12. The work management system according to claim 4, wherein the camera unit obtains camera coordinates of the tip end position of the tool by stereo matching by the camera or by capturing motions of reflection markers attached to the tool by the camera.

13. The work management system according to claim 2, wherein the management server further includes a design database, and position coordinates of the tip end position of the tool are stored as tool tip end position information in the work results database together with information showing that a work has been performed, and the tool tip end position information is managed by being linked to the design database.

14. The work management system according to claim 1, wherein position coordinates of the tip end position of the tool are stored in association with attributes information including at least worker identification information and tool information concerning the tool.

15. The work management system according to claim 2, wherein position coordinates of the tip end position of the tool are stored in association with attributes information including at least worker identification information and tool information concerning the tool.

16. The work management system according to claim 1, wherein the tool is provided with an identification feature capable of being imaged and identified by the camera of the camera unit, a plurality of the tools are simultaneously managed.

17. The work management system according to claim 2, wherein the tool is provided with an identification feature capable of being imaged and identified by the camera of the camera unit, a plurality of the tools are simultaneously managed.

18. A work management method comprising:
a step of causing a surveying instrument to start automatic tracking by a tracking unit;
a step of causing a camera unit to start measurements by a camera and a posture detecting device;
a step of acquiring trigger information of a tool;
a step of calculating position coordinates of a tip end position of the tool; and
a step of storing the position coordinates of the tip end position of the tool, wherein
the tool includes a communication unit and a trigger switch;
the camera unit includes the camera and the posture detecting device, a communication unit, a control unit configured to control the camera and the posture detecting device, and a prism, the posture detecting device being configured to acquire camera posture information of the camera, the camera being capable of identifying 3D camera coordinates from an image; and
the surveying instrument includes a communication unit and the tracking unit which is configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit,
wherein upon detection that the trigger switch has been used by communication from the tool, the camera unit collects camera posture information by the posture detecting device, a tool image by the camera, position coordinates of the prism measured by the surveying instrument, and orientation information of the camera unit viewed from the surveying instrument, and obtains and stores position coordinates of the tip end position of the tool.

19. A work management method comprising using a site controller to execute:
    a step of causing a surveying instrument to start automatic tracking by a tracking unit;
    a step of causing a camera unit to start measurements by a camera and a posture detecting device;
    a step of acquiring trigger information of a tool;
    a step of calculating position coordinates of a tip end position of the tool; and
    a step of storing the position coordinates of the tip end position of the tool in a management server,
    the tool including a communication unit and a trigger switch;
    the camera unit including a communication unit, a camera capable of identifying 3D camera coordinates from an image, a posture detecting device configured to acquire camera posture information of the camera, a control unit configured to control the camera and the posture detecting device, and a prism;
    the surveying instrument including a communication unit, a tracking unit configured to automatically track the prism by tracking light, a distance-measuring unit configured to measure a distance to the prism by distance-measuring light, an angle-measuring unit configured to measure an angle to the prism, and a control unit configured to control the tracking unit, the distance-measuring unit, and the angle-measuring unit;
    the site controller including a communication unit, a display unit, a control unit, and a storage unit, and configured to be operated by a worker; and
    the management server including a communication unit, a control unit, and a storage unit including a work results database.

* * * * *